US012459273B2

(12) United States Patent
Takei et al.

(10) Patent No.: US 12,459,273 B2
(45) Date of Patent: Nov. 4, 2025

(54) METHOD OF MANUFACTURING PRINTED MATTER, PRINTED MATTER, AND PRINTING APPARATUS

(71) Applicant: SEIKO EPSON CORPORATION, Tokyo (JP)

(72) Inventors: Shuichi Takei, Shimosuwa-machi (JP); Takuya Sonoyama, Fujimi-machi (JP); Tsuneyuki Sasaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 201 days.

(21) Appl. No.: 18/494,484

(22) Filed: Oct. 25, 2023

(65) Prior Publication Data

US 2024/0140110 A1 May 2, 2024

(30) Foreign Application Priority Data

Oct. 27, 2022 (JP) ................................. 2022-172119

(51) Int. Cl.
*B41J 2/175* (2006.01)
*B41J 11/00* (2006.01)

(52) U.S. Cl.
CPC ......... *B41J 11/00214* (2021.01); *B41J 2/175* (2013.01)

(58) Field of Classification Search
CPC ... B41J 2/175; B41J 11/00214; B29C 64/112; B31F 1/20
See application file for complete search history.

(56) References Cited

U.S. PATENT DOCUMENTS

| | | | | |
|---|---|---|---|---|
| 10,481,476 | B2 * | 11/2019 | Kubo | H04N 9/3147 |
| 2019/0184716 | A1 * | 6/2019 | Totsuka | B41J 2/21 |
| 2020/0304682 | A1 * | 9/2020 | Kubo | H04N 1/6097 |

FOREIGN PATENT DOCUMENTS

| | | |
|---|---|---|
| JP | 2022-139819 A | 9/2022 |

* cited by examiner

*Primary Examiner* — Anh T Vo
(74) *Attorney, Agent, or Firm* — WORKMAN NYDEGGER

(57) ABSTRACT

A method of manufacturing a printed matter includes: providing, on a medium, a plurality of uneven portions for water repellent, or providing a plurality of the uneven portions for water repellent and provided at an image layer formed at the medium, in which a distance between protruding portions adjacent at the plurality of uneven portions falls in a range of not less than 10 μm and not more than 100 μm, and a height of a protruding portion at the uneven portion falls in a range of not less than 10 μm and not more than 100 μm.

6 Claims, 5 Drawing Sheets

METHOD OF MANUFACTURING PRINTED MATTER, PRINTED MATTER, AND PRINTING APPARATUS

The present application is based on, and claims priority from JP Application Serial Number 2022-172119, filed on Oct. 27, 2022, the disclosure of which is hereby incorporated by reference herein in its entirety.

BACKGROUND

1. Technical Field

The present disclosure relates to a method of manufacturing a printed matter, a printed matter, and a printing apparatus.

2. Related Art

Typically, as described in JP-A-2022-139819, there is known a liquid ejecting device configured to eject a liquid onto a medium such as fabric to perform recording.

Here, when a liquid repellent function is added to a printed matter on which recording is performed using the liquid ejecting device, surface processing is performed using a chemical material such as fluorine, for example. However, due to a concern about a load on the environment, there is room for improvement.

SUMMARY

A method of manufacturing a printed matter includes providing, on a medium, a plurality of uneven portions for water repellent, or providing a plurality of the uneven portions for water repellent at an image layer formed at the medium, in which a distance between protruding portions adjacent to each other of the plurality of uneven portions falls in a range of 10 μm to 100 μm, and a height of a protruding portion of the uneven portion falls in a range of 10 μm to 100 μm.

A printed matter includes a plurality of uneven portions for water repellent at a medium or a plurality of the uneven portions for water repellent provided at an image layer formed at the medium, in which a distance between protruding portions adjacent to each other to each other of the plurality of uneven portions falls in a range of 10 μm to 100 μm, and a height of a protruding portion of the uneven portion falls in a range of 10 μm to 100 μm.

A printing apparatus includes a support portion configured to support a medium, and a discharging head configured to discharge ink toward the supported medium to form a plurality of uneven portions for water repellent at the medium.

DESCRIPTION OF EMBODIMENTS

1. First Embodiment

First, the configuration of a printing apparatus 11 will be described. The printing apparatus 11 is, for example, an ink jet-type printer configured to discharge ink serving as one example of a liquid onto a medium M such as fabric to perform printing.

On the drawings, it is assumed that the printing apparatus 11 is placed on a horizontal surface. The direction along the gravity is indicated as the Z-axis, and directions along the horizontal surface are indicated as the X-axis and the Y-axis. The X-axis, the Y-axis, and the Z-axis are perpendicular to each other.

Figure 1:
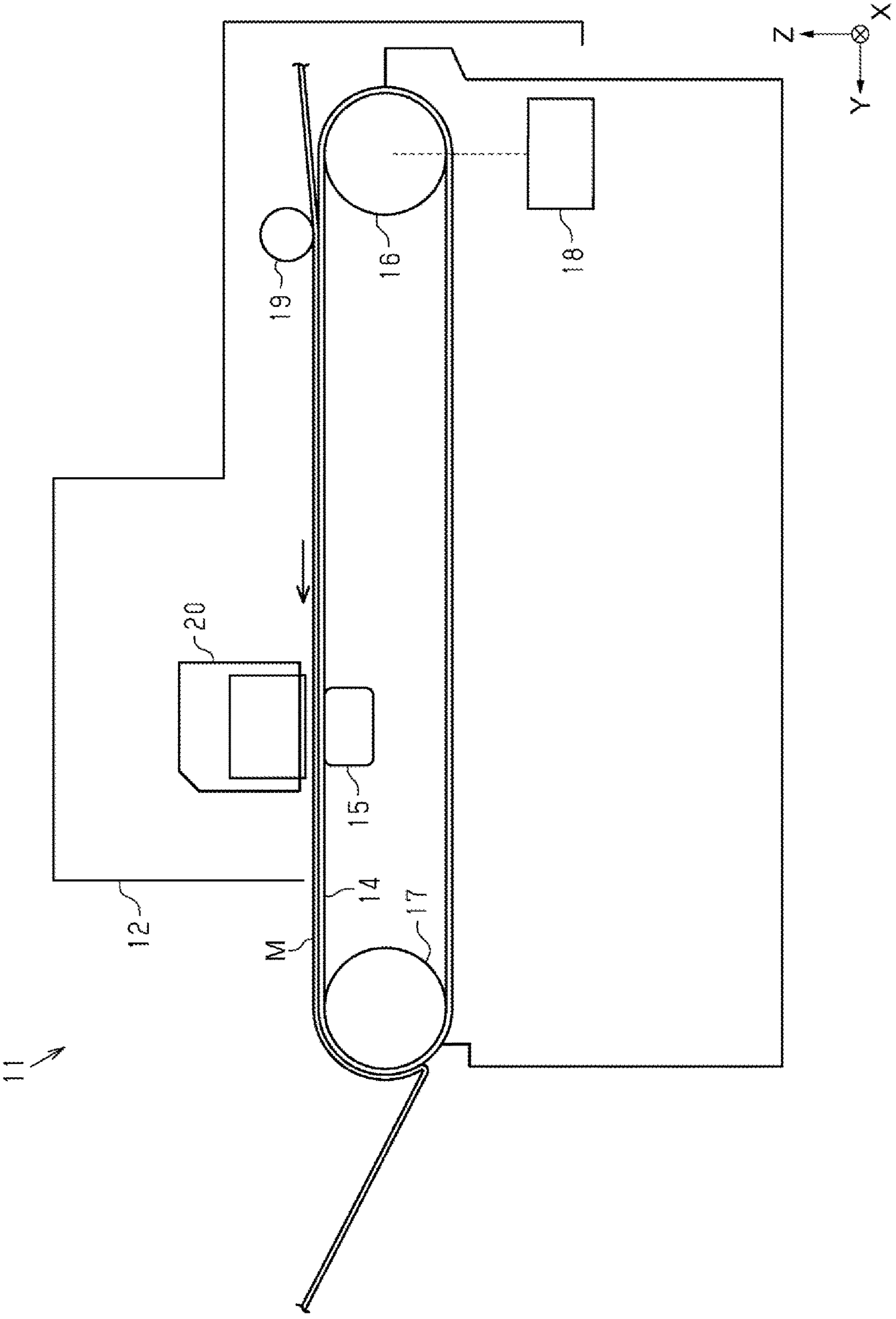
FIG. 1 is a schematic view illustrating the configuration of a printing apparatus according to a first embodiment.

As illustrated in FIG. 1, the printing apparatus 11 includes a housing 12, and a transporting belt 14 serving as a support portion configured to be able to transport the medium M. The printing apparatus 11 includes a supporting member 15 provided inside of the transporting belt 14, a driving roller 16, a driven roller 17, a drive source 18 (for example, a motor), and a pressing unit 19. The printing apparatus 11 includes a head unit 20 configured to perform printing (recording) on the medium M.

The transporting belt 14 has a circular shape, and an adhesive is applied on the outer peripheral surface of the belt. The medium M having a belt shape is attached on the transporting belt 14, and the transporting belt 14 supports the medium M. The transporting belt 14 circulates in a state where the medium M is attached thereon, to transport the medium M in a transport direction. The transport direction is a direction in which the transporting belt 14 circulates, and is the +Y direction. The transporting belt 14 in the present embodiment is configured to transport the medium M so as to be parallel to the X-axis that is a direction along the width of the medium M.

The supporting member 15, the driving roller 16, and the driven roller 17 are in contact with the inner peripheral surface of the transporting belt 14. The supporting member 15 is disposed at a position opposed from the head unit 20 with the transporting belt 14 being interposed between them. The supporting member 15 supports a portion of the medium M that is opposed to the head unit 20 and on which printing has been performed, with the transporting belt 14 being interposed between them. The driving roller 16 rotates with drive of the drive source 18, and causes the transporting belt 14 to circulate. The driven roller 17 rotates in a following manner relative to the circulating transporting belt 14.

The pressing unit 19 presses the medium M against the transporting belt 14 to cause the medium M to be attached at the transporting belt 14. The pressing unit 19 is configured to cause the medium M supplied in association with the circulation of the transporting belt 14, to be attached at the transporting belt 14.

Figure 2:
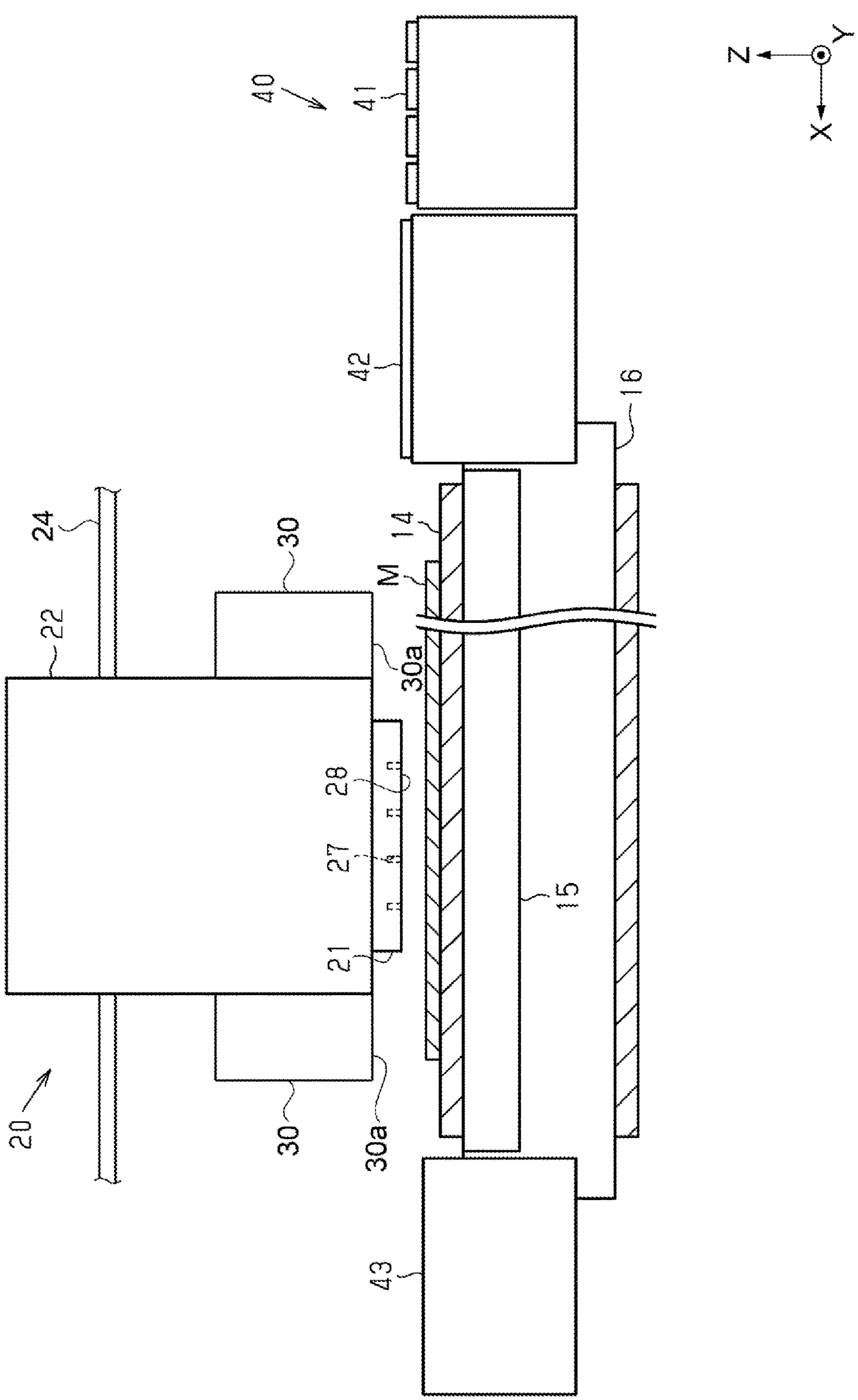
FIG. 2 is a schematic view illustrating the configuration of a head unit according to the first embodiment.

As illustrated in FIG. 2, the head unit 20 includes a discharging head 21 configured to discharge ink, and a carriage 22 configured to hold the discharging head 21. The head unit 20 includes a guide shaft 24 configured to support the carriage 22, and a carriage motor (not illustrated) configured to move the carriage 22.

The guide shaft 24 extends along the X-axis. With drive of the carriage motor, the carriage 22 reciprocates along the guide shaft 24. In association with movement of the carriage 22, the discharging head 21 moves in a direction along the X-axis. In addition, the discharging head 21 moves while discharging ink to perform printing on the medium M.

The discharging head 21 includes a nozzle surface 28 at which a plurality of nozzles 27 are opened. The discharging head 21 is configured to discharge ink from the nozzles 27 provided at the nozzle surface 28. The discharging head 21 discharges ink from each of the nozzles 27 in the −Z direction. The discharging head 21 includes a plurality of nozzle rows in which the nozzles 27 are aligned in a direction along the Y-axis. Each of the nozzle rows is arranged in a direction along the X-axis.

The discharging head 21 may be configured to discharge different types of ink for each of the nozzle rows. The type of ink is, for example, a color. The discharging head 21 discharges, for example, magenta ink, yellow ink, cyan ink, and black ink.

The ink according to the present embodiment is ink (photocurable ink) having a photocurable property. The photocurable ink is ultraviolet-light curable ink, and has a property in which, as the ink is irradiated with light containing ultraviolet light, the ink is cured. The photocurable ink contains a coloring agent such as pigment, a photopolymerizable monomer, and a photo-polymerization initiator system, and also contains other various types of additives such as photosensitizer, a polymerization inhibitor, scavenger, an antioxidant, UV absorber, plasticizer, a surface-active agent, a levering agent, a thickening agent, a dispersing agent, an anti-foaming agent, a preservative, and a solvent, on an as-necessary basis.

An emitting unit 30 is disposed at the carriage 22. The emitting unit 30 emits light onto the medium M (applied photocurable ink) on which ink is applied. The emitting unit 30 includes a UV lamp, and light including ultraviolet light is emitted downward from an emitting surface 30*a* provided at an end portion, in the −Z direction, of the emitting unit 30. The photocurable ink applied on the medium M is cured with irradiation of ultraviolet light. The emitting unit 30 according to the present embodiment is disposed at the −X-direction side and the +X-direction side of the discharging head 21. This makes it possible to cause the discharging head 21 to scan in the direction along the X-axis to discharge the photocurable ink, and also emit light from the emitting unit 30 to cure the photocurable ink applied on the medium M.

The discharging head 21 according to the present embodiment discharges the photocurable ink on the medium M supported by the transporting belt 14 to form a plurality of uneven portions 100 for water repellent (FIGS. 4, 5A, and 5B) on the medium M.

Note that the emitting unit 30 may be configured so as to be disposed at either the −X-direction side or the +X-direction side of the discharging head 21.

The printing apparatus 11 includes a maintenance unit 40 configured to perform a maintenance operation to the discharging head 21. The maintenance unit 40 includes a cap 41, a wiping unit 42, and an ink accommodating unit 43. The cap 41 and the wiping unit 42 are disposed at the −X direction of the transporting belt 14. The ink accommodating unit 43 is disposed at the +X direction of the transporting belt 14.

The cap 41 is provided so as to be able to move to a departing position that is a position at the lower portion, and also to a capping position that is a position higher than the departing position. The cap 41 disposed at the capping position is in contact with the nozzle surface 28 of the discharging head 21 to close the space that communicates with the openings of the nozzles 27. With this configuration, a closed space including the inside of the nozzles 27 is formed. The wiping unit 42 is configured to perform wiping in which the unit moves, for example, in a direction along the Y-axis to wipe the nozzle surface 28.

The ink accommodating unit 43 accommodates ink discharged from the discharging head 21 through flushing. The flushing is maintenance in which ink is discharged as a waste liquid with the aim of preventing and resolving clogging of the nozzles 27.

Figure 3:
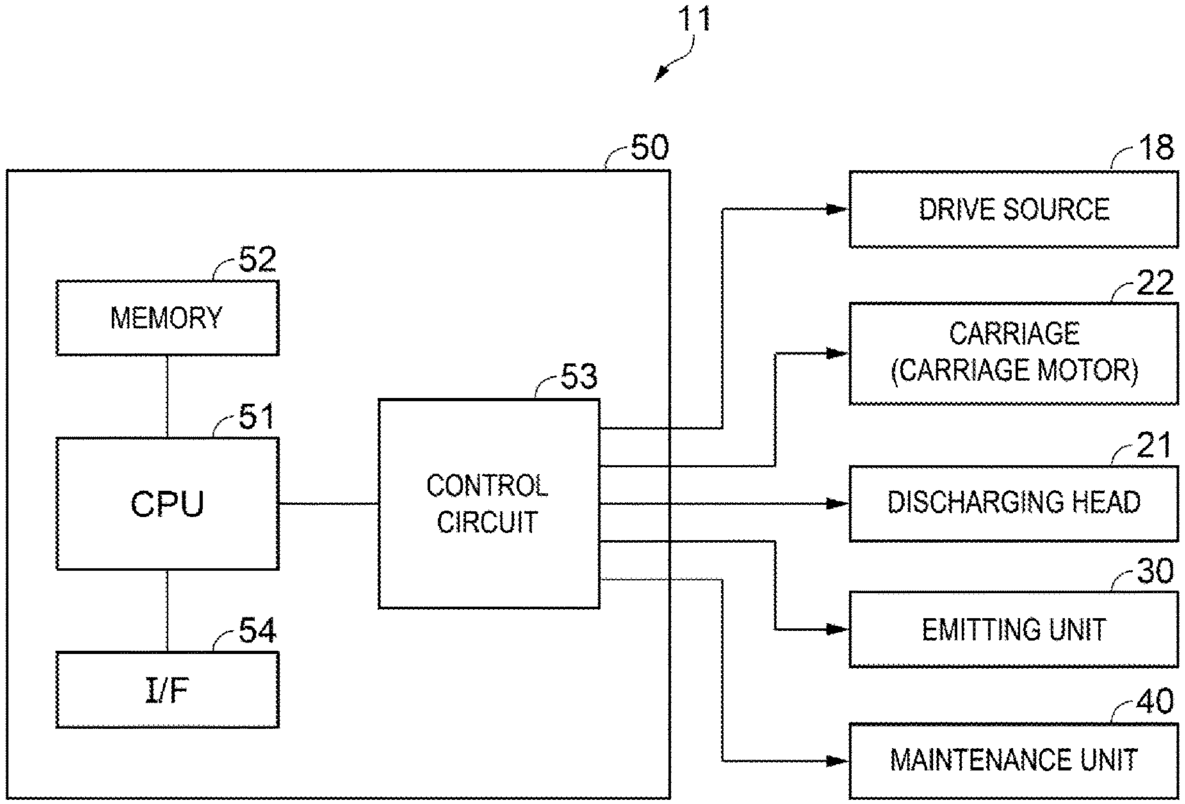
FIG. 3 is a block diagram illustrating the configuration concerning control of the printing apparatus according to the first embodiment.

As illustrated in FIG. 3, the printing apparatus 11 includes a control unit 50 configured to control various types of operations performed in the printing apparatus 11. The control unit 50 includes a CPU 51, a memory 52, a control circuit 53, and an interface (I/F) 54. The CPU 51 is an arithmetic processing device. The memory 52 is an area where various types of programs are stored or is a storage unit used to secure a working area or the like, and includes a storage element such as a RAM, EEPROM, or the like. For example, upon acquiring print data or the like through the I/F 54 from the outside of an information processing terminal or the like, the CPU 51 executes computation in accordance with various types of programs to control each of driving units or the like through the control circuit 53.

Next, description will be made of a method of manufacturing a printed matter PM1 in the printing apparatus 11.

Figure 4:
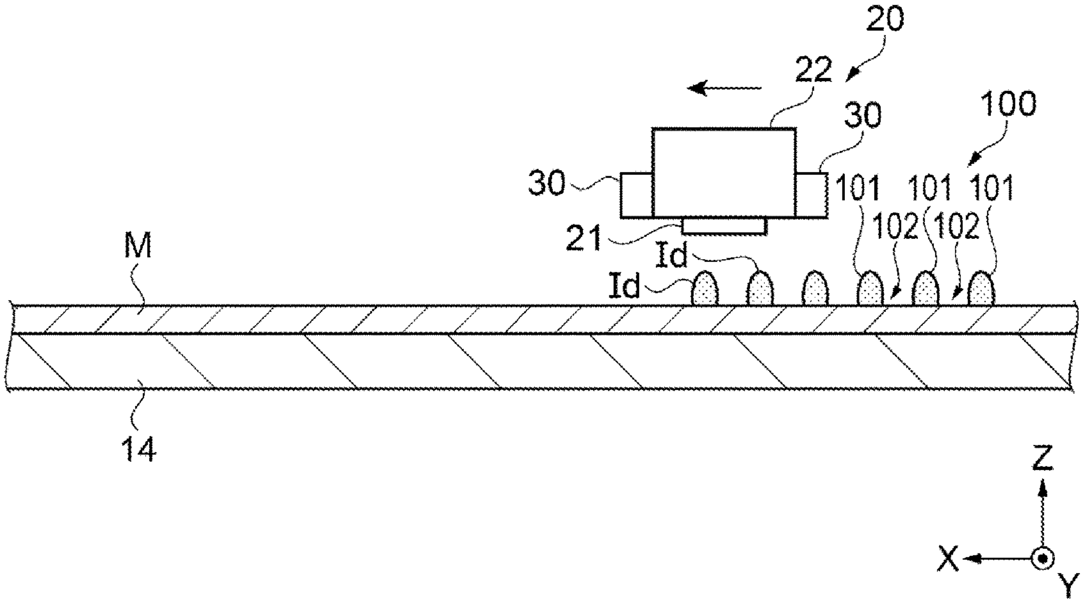
FIG. 4 is a schematic view illustrating a method of manufacturing a printed matter according to the first embodiment.

As illustrated in FIG. 4, the control unit 50 receives print data from the information processing terminal through the I/F 54. The control unit 50 analyzes details of various types of commands included in the received print data, and transmits, to each of driving units, a control signal used to perform a transport operation for transporting the medium M or form an ink dot Id.

Next, the control unit 50 moves, in the transport direction, the transporting belt 14 where the medium M is supported. In addition, the control unit 50 causes the photocurable ink to be discharged from the discharging head 21 while causing the carriage 22 to move in the scanning direction, and forms a plurality of ink dots Id on the medium M.

Note that the position on the medium M where the ink dots Id are applied is set on an as-necessary basis. For example, the printing process is performed under the condition where the distance between adjacent ink dots Id falls in a range of 10 μm to 100 μm.

Figure 5A:
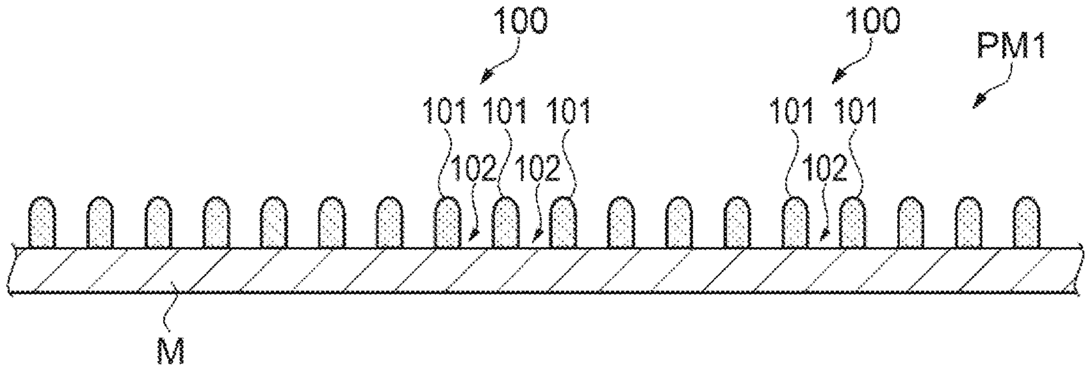
FIG. 5A is a side view illustrating the configuration of a printed matter according to the first embodiment.
Figure 5B:
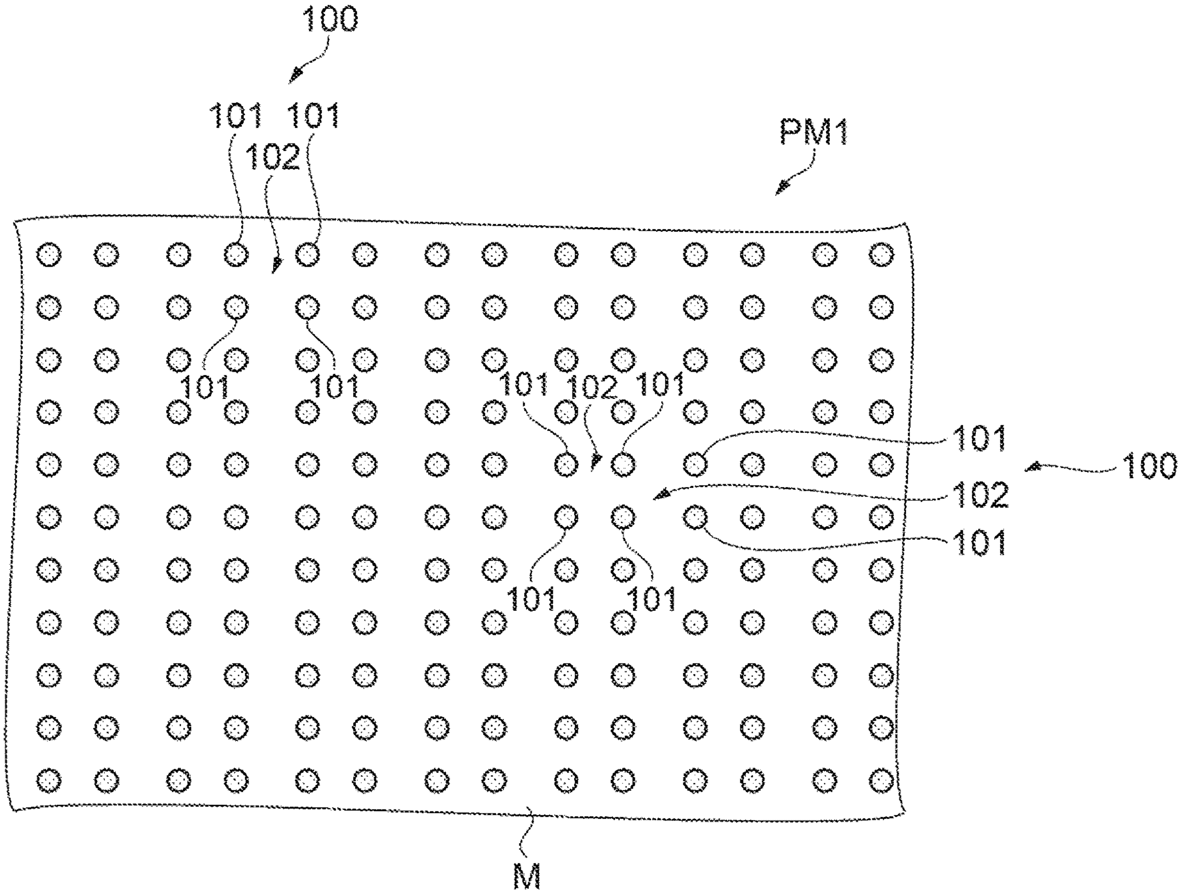
FIG. 5B is a plan view illustrating the configuration of the printed matter according to the first embodiment.

In addition, the control unit 50 causes the emitting unit 30 to drive to emit light onto the medium M (ink dots Id). With this configuration, the ink dots Id are cured, and a plurality of protruding portions 101 are formed on the medium M. Furthermore, a recessed portion 102 is formed between adjacent protruding portions 101. With this configuration, the printed matter PM1 on which the plurality of uneven portions 100 are provided on the medium M is formed, as illustrated in FIGS. 5A and 5B. The uneven portion 100 is comprised of the plurality of protruding portions 101 and the recessed portion 102 between the protruding portions 101. In the present embodiment, the distance between protruding portions 101 is formed so as to fall in a range of 10 μm to 100 μm. Furthermore, the dimension of the diameter of the protruding portion 101 is approximately 10 μm.

In addition, the height of the protruding portion 101 is set on an as-necessary basis. For example, the printing process is performed such that the height of the protruding portion 101 falls in a range of 10 μm to 100 μm. Here, when the height of the ink dot Id formed by one scanning does not reach the desired height, the protruding portion 101 is formed using the emitting unit 30, and then, the ink dot Id is formed on this protruding portion 101 again to perform a light emitting process, thereby being able to form the protruding portion 101 having the desired height.

The image pattern of the uneven portion 100 formed on the medium M can be set on an as-necessary basis. For example, it is possible to form various types of image patterns including a lattice-form pattern, a dotted pattern, a staggered pattern, a geometric pattern, and the like. In addition, it may be possible to form each of the protruding portions 101 with photocurable ink having different colors.

In the printed matter PM1 according to the present embodiment, an air layer is formed at the recessed portion 102 between adjacent protruding portions 101 at the plurality of uneven portions 100. In the present embodiment, the air layer is formed throughout the entire surface of the printed matter PM1. Thus, when water droplets come into contact with the printed matter PM1, the air layer serves as a barrier layer, which makes it possible to prevent the water droplets from coming into contact with the medium M, and repel the water droplets. That is, the plurality of uneven portions 100 have a water-repellent function, which enables the printed matter PM1 itself to have a water-repellent property. Thus, for example, the contact angle of water droplets is approximately 100°, which is extremely high, and it is possible to achieve a water-repellent effect. Thus, it is possible to manufacture the printed matter PM1 having water repellency with the manufacturing method that poses a reduced load on the environment.

2. Second Embodiment

Next, the second embodiment will be described. Note that configurations identical to those in the first embodiment will be denoted by the same reference characters, and redundant description will not be provided.

Below, a method of manufacturing a printed matter PM2 using the printing apparatus 11 will be made.

Figure 6:
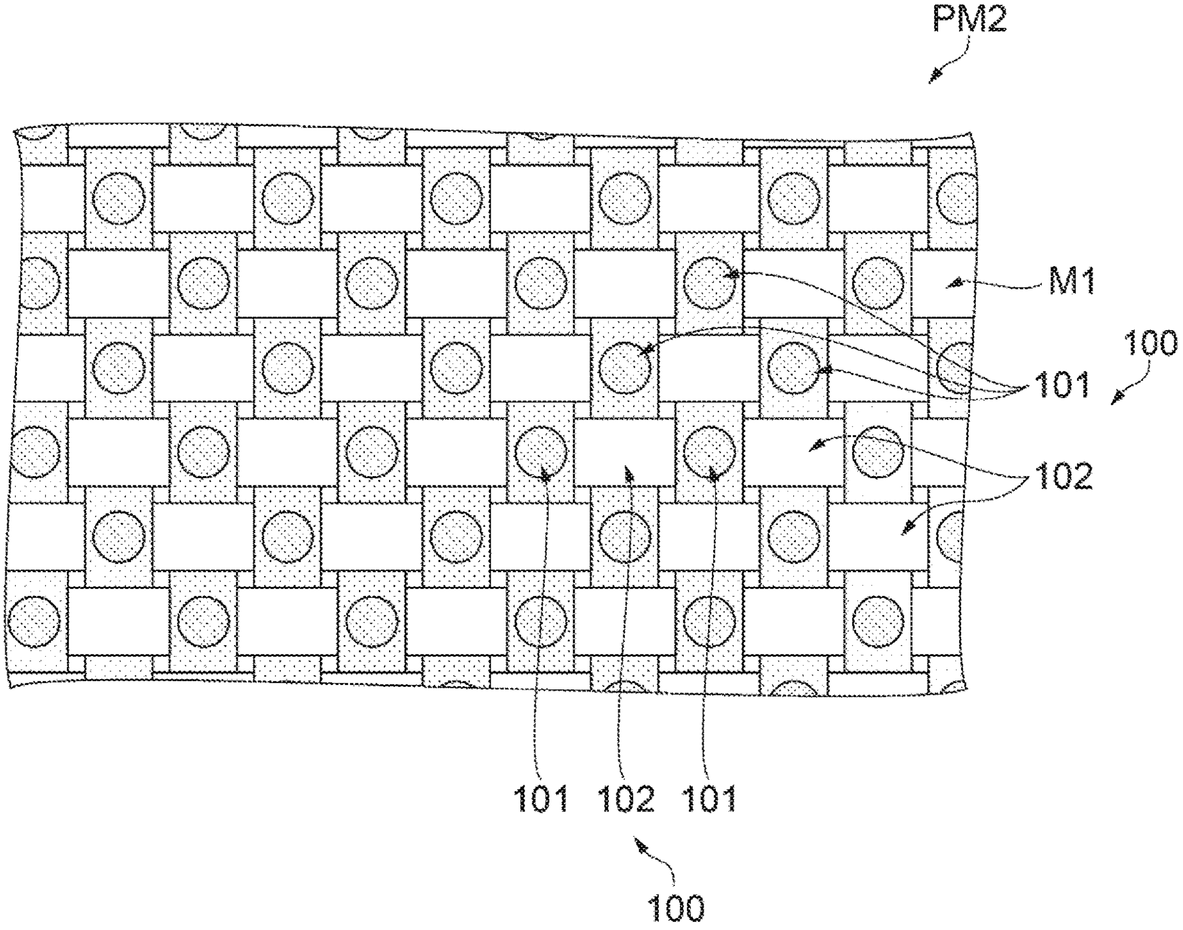
FIG. 6 is a plan view illustrating the configuration of another printed matter according to a second embodiment.

As illustrated in FIG. 6, in the present embodiment, the uneven portion 100 is formed in accordance with the shape of a medium M1, thereby manufacturing the printed matter PM2. In the present embodiment, the uneven portion 100 is formed in accordance with the shape resulting from the way of weaving of the medium M1. In the present embodiment, the medium M1 is fabric formed in a form of plain weave. The plain weave is a way of weaving in which a warp thread and a weft thread are crossed one by one. Thus, in the case of the medium M1 with plain weave, unevenness is formed at the medium M1 itself. In addition, the present embodiment uses photocurable ink to form the ink dot Id on a protruding portion of the unevenness of the medium M1 itself. With this configuration, it is possible to form the protruding portion 101 at the protruding portion of the unevenness of the medium M1 itself. In addition, the recessed portion of the unevenness of the medium M1 itself is used as the recessed portion 102.

In the printed matter PM2, by using the shape of the medium M1, the dimension in distance between the top portion of the protruding portion 101 and the bottom of the recessed portion 102 further increases. This makes it easy to form the air layer, which makes it possible to further enhance the water repellent property.

Note that there is no particular limitation as to the shape of the medium M1. For example, the way of weaving of the medium M1 may be twill weave or satin weave, in addition to plain weave.

3. Third Embodiment

Next, a third embodiment will be described. Note that configurations identical to those in the first embodiment will be denoted by the same reference characters and redundant descriptions will not be provided.

Below, description will be made of a method of manufacturing a printed matter PM3 using the printing apparatus 11.

Figure 7:
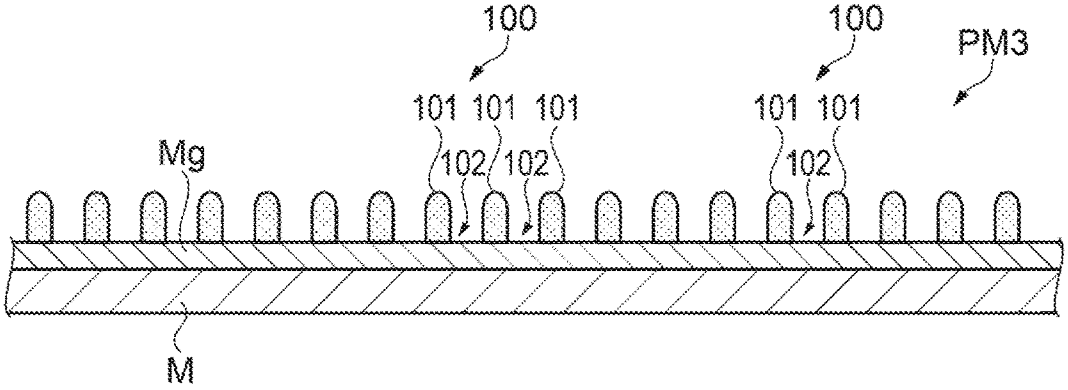
FIG. 7 is a side view illustrating the configuration of another printed matter according to a third embodiment.

In the present embodiment, a printed matter PM3 is manufactured by providing the plurality of uneven portions 100 for water repellent on an image layer Mg formed on the medium M, as illustrated in FIG. 7.

Specifically, a printed matter on which an image has already been formed on the medium M is supported by the transporting belt 14, and the transporting belt 14 that supports this printed matter is moved in the transport direction. Note that there is no particular limitation as to the ink used to form the image layer Mg, and it may be possible to use ink for textile printing or the like, for example.

Then, the photocurable ink is discharged on the image (image layer Mg) formed on the medium M to form a plurality of ink dots Id on the medium M. Next, the emitting unit 30 is driven to emit light onto the image layer Mg (ink dot Id). With this configuration, the ink dots Id are cured, and the plurality of protruding portions 101 are formed on the image layer Mg. In addition, the recessed portion 102 is formed between adjacent protruding portions 101. With this configuration, the printed matter PM3 on which the plurality of uneven portions 100 are provided on the image layer Mg is formed.

In the printed matter PM3 according to the present embodiment, an air layer is formed at the recessed portion 102 formed between adjacent protruding portions 101 at the plurality of uneven portions 100. Thus, when water droplets come into contact with the printed matter PM3, the air layer serves as a barrier layer, which makes it possible to prevent the water droplets from coming into contact with the image layer Mg, and repel the water droplets. That is, the plurality of uneven portions 100 have a water-repellent function, which enables the printed matter PM3 itself to have a water-repellent property. Thus, it is possible to manufacture the printed matter PM3 having water repellency with the manufacturing method that poses a reduced load on the environment.

Note that the printed matters PM1, PM2, and PM3 having a water-repellent function as described above can be used as a printed fabric or an apparel product. For example, these printed matters can be used as an outdoor apparel, sportswear, rain coats, outdoor wear, outdoor tens, roofs, and the like. Furthermore, these printed matters can also be used as a home textile product, a floor mat, a kitchen related items, a curtain, or the like.

Note that, for the medium M, it may be possible to use fabric cloth, a knit, a fleece fiber, or the like. In addition, for these types of thread, it may be possible to use cotton, polyester, silk, wool, nylon, or the like.

Furthermore, in the present embodiment, the photocurable ink is used as ink. However, the ink is not limited to this. For example, it may be possible to use ink for textile printing (reactive, acid, dispersible, pigment, or the like), water-based paper medium-compatible ink, pigment paper medium-compatible ink, or the like. Note that, when ink other than photocurable ink is used as ink, it is only necessary that the emitting unit 30 is not provided.

What is claimed is:

1. A method of manufacturing a printed matter including: providing, at a medium, a plurality of uneven portions for water repellent, or providing a plurality of the uneven portions for water repellent at an image layer formed at the medium, wherein a distance between protruding portions adjacent to each other of the plurality of uneven portions falls in a range of 10 μm to 100 μm, and a height of the protruding portion of the uneven portions falls in a range of 10 μm to 100 μm.

2. The method of manufacturing a printed matter according to claim 1, wherein the plurality of the uneven portions are formed with ink.

3. The method of manufacturing a printed matter according to claim 2, wherein the ink is ultraviolet-light curable ink.

4. The method of manufacturing a printed matter according to claim 1, wherein the uneven portions are formed in accordance with a shape of the medium.

5. A printed matter comprising:

a plurality of uneven portions for water repellent at a medium, or a plurality of the uneven portions for water repellent provided at an image layer formed at the medium, wherein a distance between protruding portions adjacent to each other of the plurality of uneven portions falls in a range of 10 μm to 100 μm, and a height of a protruding portion of the uneven portion falls in a range of 10 μm to 100 μm.

6. A printing apparatus comprising:

a support portion configured to support a medium; and a discharging head configured to discharge ink toward the supported medium to form a plurality of uneven portions for water repellent at the medium.

* * * * *